Nov. 21, 1967   M. B. WIDESS ET AL   3,354,427
DISPLAYING SEISMIC DATA AS NARROW TRACES, WITHOUT COMPOSITING
Original Filed Nov. 22, 1963   4 Sheets-Sheet 1

MOSES B. WIDESS
KARL DYK
　　INVENTORS.

BY Newell Pottoff
　　ATTORNEY.

MOSES B. WIDESS
KARL DYK
    INVENTORS.

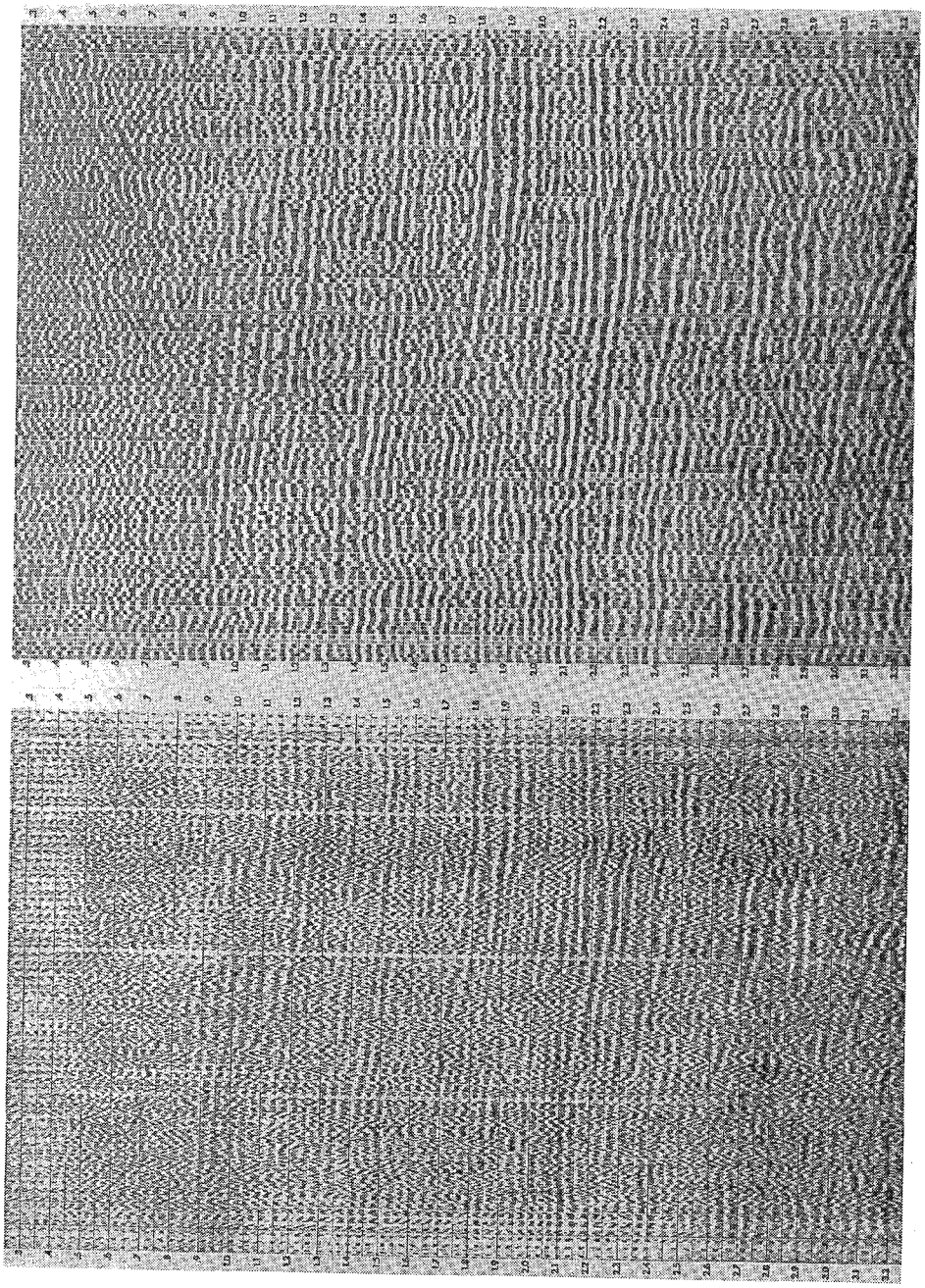

INVENTORS
MOSES B. WIDESS
KARL DYK
ATTORNEY

United States Patent Office 3,354,427
Patented Nov. 21, 1967

3,354,427
DISPLAYING SEISMIC DATA AS NARROW
TRACES, WITHOUT COMPOSITING
Moses B. Widess, Fort Worth, Tex., and Karl Dyk, Tulsa, Okla., assignors to Pan American Petroleum Corporation, Tulsa, Okla., a corporation of Delaware
Continuation of application Ser. No. 325,578, Nov. 22, 1963. This application Oct. 10, 1966, Ser. No. 598,555
8 Claims. (Cl. 340—15.5)

ABSTRACT OF THE DISCLOSURE

Common depth-point seismic data are displayed as separate narrow constant-width traces systematically arranged in a group for each depth point, rather than composited into a single trace. Desired waves, such as primary seismic reflections, continue to appear as alignments across a display of many groups, while other non-random waves, such as multiple reflections, show different but characteristic patterns which identify them.

---

This application is a continuation of our application Ser. No. 325,578, filed Nov. 22, 1963, and now abandoned.

This invention relates to seismic geophysical surveying and is directed to an improved method of displaying seismic data for interpretation. More specifically, the invention is directed to seismic data displays having most of the advantages of trace compositing without certain of the attendant disadvantages.

In one form or another, most attempts to improve the seismic signal-to-noise ratio have depended upon compositing increased numbers of seismic-wave travel paths wherein the desired signals are in phase, or can be placed in phase by trace shifting, while the undesirable or noise waves, not being similarly in phase, tend to cancel each other. Theoretically, the improvement in signal-to-noise ratio varies as $\sqrt{n}$, where $n$ is the number of independent determinations of the signal plus noise which can be added together. Thus, by making $n$ sufficiently large, it would appear possible to attain almost any desired degree of signal improvement.

In practice, however, this improvement fails for the reason that a large part of the undesired seismic energy appearing on the records is not random, but is definitely associated with the seismic source, so that cancellation due to randomness is only partially effective. This is borne out, for example, by the observation frequently made that, when a synthetic seismogram trace is computed on the basis of data obtained from continuous velocity well logging, it is often necessary to include multiple reflections in order for the synthetic trace to make even a reasonable approximation of the field trace at the well location. Multiple reflections are only one type of non-random seismic energy which may interfere with primary reflections. Certain kinds of subsurface discontinuities may give rise to diffracted and refracted waves, conversion waves which travel different portions of their path in different form, shear waves, layer- or boundary-guided waves, and miscellaneous reverberations.

Although the electrical or analogous composing of seismic-wave traces, corrected to a common datum, has been recognized as a powerful tool for signal improvement, this advantage is in some degree offset by the fact that the non-random noise, while relatively obscured, may still be present. In such compositing it is always in some degree uncertain as to just how complete the non-random noise cancellation has been, and whether the noise that remains has seriously affected the signal. Further, electrical compositing tends to obscure errors made in applying corrections, so that the reflection quality is degraded without the interpreter being aware of the errors.

In view of the foregoing, it is a primary object of our invention to provide a novel and improved seismic data display which avoids certain of these ambiguities without sacrificing the chief advantages of trace compositing. A further object of our invention is to provide a seismic data display which shows in a non-conflicting manner both the desired reflection events as well as interfering waves and the like, so that a valid judgment of reflection reliability is possible. A still further object of our invention is to provide an improved seismic data display capable of showing errors of initiation or correction which tend to be averaged into composited traces and thus contribute error thereto. Still another object of our invention is to provide a seismic data display wherein the random noise does not prevent detecting reflection alignments and where non-random noise is shown as characteristic alignments, different in form from the reflection alignments but without conflicting therewith. Other and further objects, uses, and advantages of our invention will become apparent as the description proceeds.

Stated briefly, the foregoing and other objects are accomplished, in accordance with our invention, by first performing correction operations upon all of the traces to be displayed, which normally include related traces; and then, instead of compositing the related traces, upon which the desired signals are expected to be in phase, all traces are displayed side by side in a narrow format, with the most closely related traces adjacent each other and systematically arranged. In making such a display, it is preferable to utilize the variable-density trace form, and to employ a ratio of horizontal distance to vertical record time similar to conventional composite-trace displays. In other words, where $n$ traces are normally composited into a single electrical trace and displayed as a single band of given width, in our invention the same $n$ traces are all individually displayed side by side in about the same given width of display space, as narrow traces arranged next to each other in a systematic manner.

One result of making such a narrow-trace display in variable-density form is that the desired-signal alignments occur substantially the same as in the composite trace displays, and in addition non-random noise presents angular patterns or alignments of characteristic and different form, so that its presence along with the desired-signal alignments can be clearly seen. An incorrect trace due to a faulty weathering, elevation, or move-out correction or the like, is not obscured by being included in an average electrical effect, but becomes readily apparent and can be corrected if desired. By being able to see the patterns or angular alignments of non-random interfering or noise waves, the interpreter is much better able to estimate their probable effect upon the desired signals. Thus, the reliability of an interpretation is substantially improved, while the emphasis of signals produced by electrical compositing is still present in the form of the most pronounced alignments. In a sense, the eye in viewing such a display performs a type of visual compositing analogous to that previously done electrically.

This will be better understood by reference to the accompanying drawings forming a part of this application and showing typical embodiments of apparatus for producing displays in accordance with our invention, together with comparative displays of actual seismic data. In these drawings, FIGURE 1 shows diagrammatically and partially in cross section an apparatus for preparing a display in accordance with our invention;

FIGURE 7 is a photographic reproduction of part of a seismic data display made in accordance with the invention;

FIGURE 8 is a photographic reproduction of the same data shown in FIGURE 7, conventionally electrically composited and displayed in variable-density form.

First, before considering the drawings in detail, certain definitions of terms used hereinafter should be made clear. By the term "related traces," as used herein, it is intended to refer to two or more traces which in the prior art could be composited for signal reinforcement. Such related traces utilize the same reflection point or area on each subsurface interface, while the point of generation or the point of reception of the seismic waves, or both, are varied in a systematic manner. The term "systematically arranged," as applied to the placing of related traces in a display group, means related traces arranged in a progressive order of the variable parameter, such as an increasing or decreasing horizontal source-to-detector spacing, for example, of traces utilizing a common reflection point or area on a subsurface interface. The term "constant-width," descriptive of the preferred form of display trace, means a trace that is recorded along a constant-width strip or band of the display space, and thus includes a variable-area trace that utilizes varying proportions of the constant-width strip within which it is confined.

In what follows it is to be understood that the manner of obtaining the related-trace data is by employment of conventional field procedures, and further that the correcting of the various traces for static and dynamic differences of travel time of the desired signals with reference to a common datum, can be and has been carried out in any of a number of convetnional ways. Accordingly, it is assumed that the individual data traces are in a form suitable for direct compositing in an electrical circuit, for example, to produce summation of the desired signals and cancellation of the noise waves. This assumption, however, is made only to simplify the description to follow, as it will be apparent that playback can be made directly from field tapes into a final display, with correction programming equipment in operation to introduce the proper corrections on each trace as it is thus transcribed. That is, correction and display in accordance with the invention can be combined in practice in a single operation so that there is no need for intermediate storage of the data.

Figure 1:
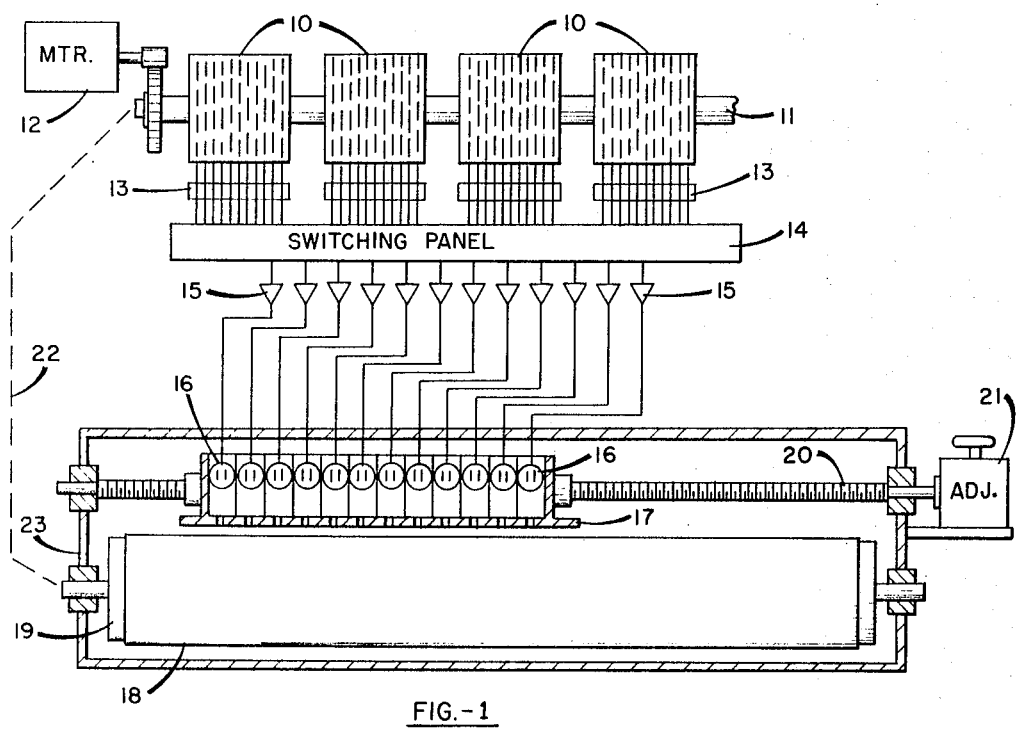

Instead of performing compositing equivalent to the electrical compositing of the prior art, the data are utilized by a display system such as that shown in FIGURE 1. The corrected traces ready for display are stored on a plurality of magnetic-tape drums 10, suitably synchronized as by mounting on a common shaft 11, and rotatable at constant speed by a motor 12. Associated with each drum 10 is an array of reproducing heads 13 with electrical leads extending to a switching panel 14. By means of panel 14, any twelve of heads 13, reproducing data representing twelve successive subsurface reflection points or areas lying along a surveying profile line, for example, can be connected to the respective inputs of twelve amplifiers 15.

The outputs of amplifiers 15 are respectively applied to and energize glow tubes 16 to expose, through the apertures of a mask 17, variable-density traces on a photographic recording medium 18 wrapped about the surface of an elongated cylindrical drum 19. The array of glow tubes 16 and the mask 17 form a recording camera unit movable in a precise manner along the length of drum 19 by rotation of a lead screw 20, either manually or automatically, by a calibrated adjusting unit 21. A mechanical driving connection 22 between drums 10 and 19 provides synchronism of rotation of these drums, while a light-tight enclosure 23 surrounding the drum 19 and recording camera unit shields medium 18 from fogging by stray light.

The showing of twelve reproducing and display-recording channels in FIGURE 1 is by way of an example only, as any desired number of parallel recording channels can be used in the manner shown. In one particular apparatus constructed in accordance with our invention, thirty-six reproducing and variable-density recording channels were provided for simultaneous operation.

Figure 2:
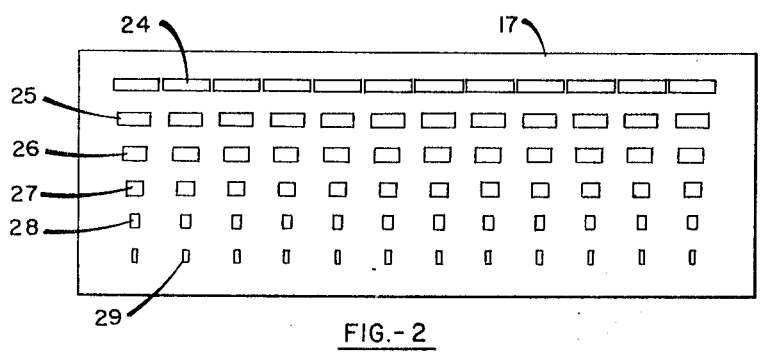
FIGURE 2 is a plan view of the mask element of FIGURE 1.
Figure 3:
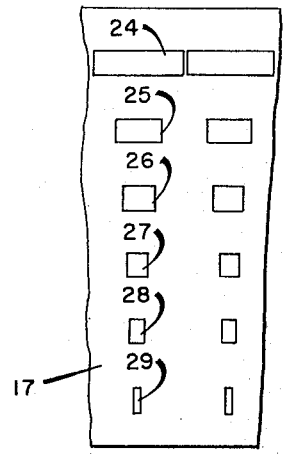
FIGURE 3 is an enlarged plan view of a portion of the mask of FIGURE 2.

The character and arrangement of the recorded traces produced by the system of FIGURE 1 can be better understood from FIGURE 2 showing a plan view of the mask 17 and FIGURE 3 showing typical aperture relationships of the mask. The wide apertures of row 24 are those that might be used in preparing a conventional, prior-art display of variable-density traces separated by very narrow gaps.

The apertures of row 25 have the same spacing but only one-half the width of apertures 24 and are used when two related traces are to be placed in each related-trace group. Thus, after twelve traces of data representing twelve spaced reflection points along a profile line have been exposed on medium 18, mask 17 and glow tube array 16 are shifted lengthwise as a unit by the adjuster 21 and lead screw 20, by an amount just equal to the width of one of apertures 25. The next twelve traces representing the same twelve reflection points are thus interlaced between the first twelve traces to form twelve trace groups of two related traces each. It is, of course, understood that switching panel 14 is reset prior to each recording pass to select the proper traces from the drums 10. When the field data have been recorded by a progressive, systematic procedure of occupying successive source and detector position along a survey line, some or all of the switching of panel 14 and shifting of mask 17 can be done automatically, and it is necessary only to load and unload drums 10 in the proper sequence.

In the same way apertures 26, each one-third the width of apertures 24, are used for recording data having traces related in groups of three. The apertures of rows 27, 28, and 29 respectively, each of a width one-fourth, one-sixth, and one-twelfth that of apertures 24, are used for related-trace groups of four, six, and twelve traces, respectively. The narrow gaps that separate the adjacent wide traces made using apertures 24 may be retained between the two-, three-, four-, six-, or twelve-trace groups so that the different groups can be visually distinguished during interpretation. The lengthwise movement of mask 17 between successive recording passes of drum 19 by only the width of the apertures in use, however, places the related traces of each group in contact so as to emphasize and aid the visual merging of adjacent traces where alignment occurs within the group.

Figure 9:
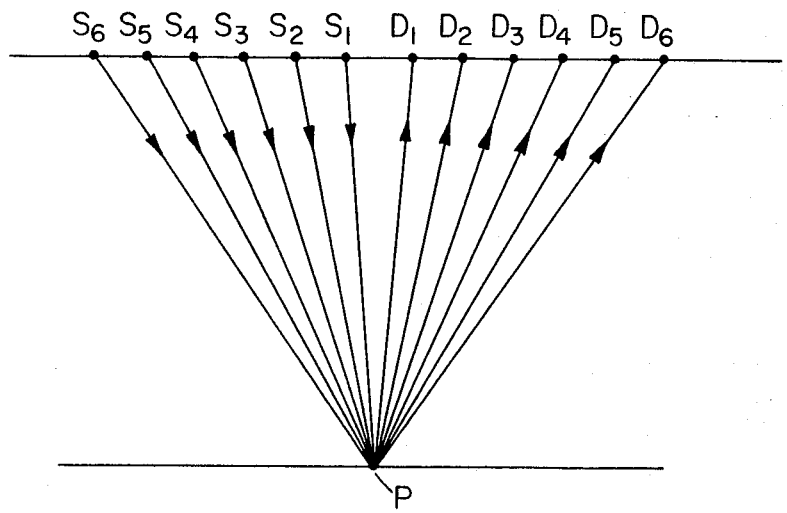
FIGURES 9, 10 and 11 are diagrammatic earth cross-sections showing various conventional source-detector arrangements that produce common reflection point data.
Figure 10:
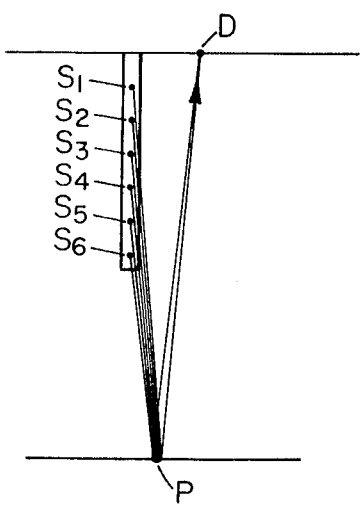
Figure 11:
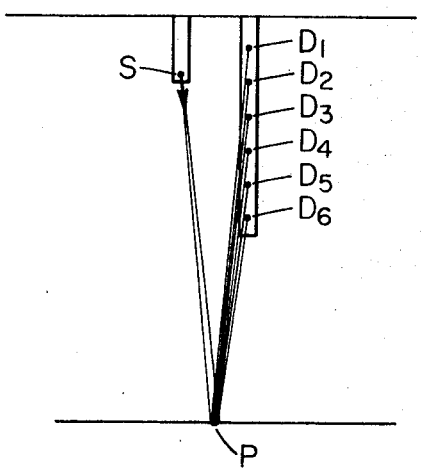

To take a specific example, field data obtained by a procedure to provide six-fold subsurface coverage would be displayed by use of the apertures 28. The six traces recorded through a given one of the apertures 28, in the six successive positions occupied in moving mask 17 one width of an aperture 28 for each recording pass, typically represent six traces utilizing the same subsurface reflection point P shown in FIGURES 9, 10 and 11. Preferably, the arrangement or order in which the six traces occur (from left to right, for example) is systematic in some field parameter being varied for recording the traces. Thus, the six related traces of a group or set might be arranged in an ascending or descending order of distances $S_1$–$D_1$, $S_2$–$D_2$, etc., between the sources $S_1$–$S_6$ and the detectors $D_1$–$D_6$ shown in FIGURE 9. Or the six related traces might be displayed in the order of the shot points $S_1$–$S_6$ (FIGURE 9) from which they originated, proceeding in a given direction along the line of seismic profiling. Alternatively, if the six traces represent six different depths of shooting such as $S_1$–$S_6$ of FIGURE 10 or of detection in a bore hole, such as $D_1$–$D_6$ of FIGURE 11, the traces are preferably arranged in an order of increasing or decreasing depth of the shot or the detector.

Further, multiple relationships may exist in that the related traces may represent a given subsurface reflection point or area determined with a plurality of different source-detector spacings, each such spacing utilizing a plurality of different shot depths or detector depths, or both. Thus, twenty-seven related traces would result from firing three shots in each of three holes and receiving each shot with three vertically spaced detectors in three different holes, the respective shot and detector holes in every instance being symmetrically arranged with respect to a mid-point between them so as to preserve a given subsurface reflection point or area for all twenty-seven traces. By proper choice of the arrangement or order of display of such a large number of related traces, it is frequently possible to produce not only outstanding alignments of desired waves, but also other and different characteristic forms of alignment of particular interfering waves can be rendered visible. Mutiple reflections in particular, due to their different normal moveout pattern from primary reflections, can be made to develop characteristic umbrella-shaped alignments. Thus, while systematic trace arrangements are not essential to observing the alignments of desired waves, they can be quite helpful in identifying the nature of the interfering waves.

Figure 4:
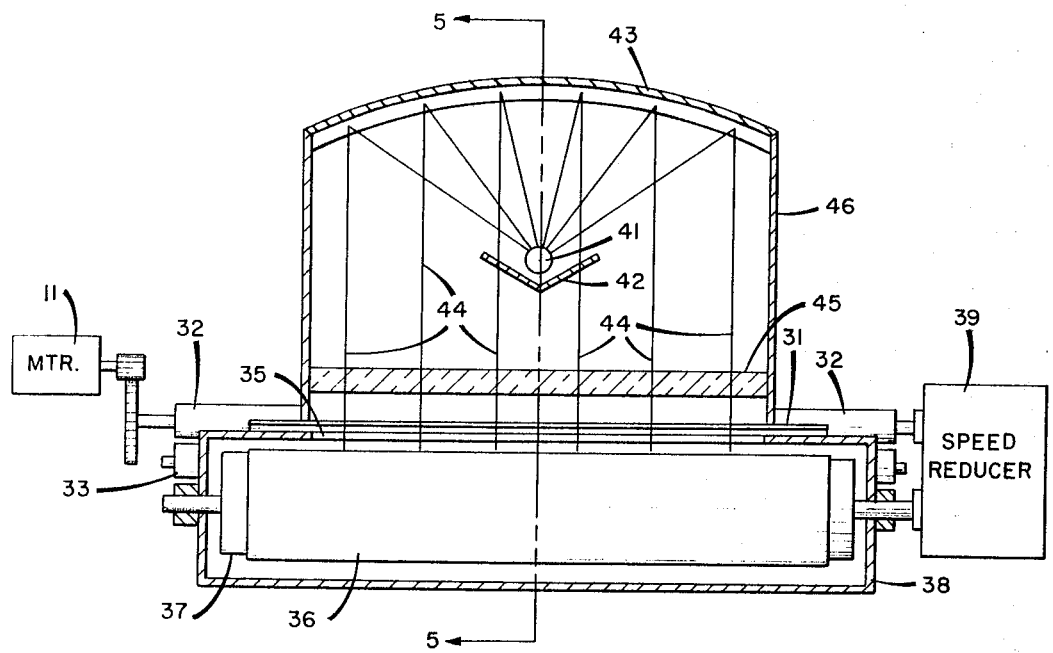
FIGURE 4 is an elevation view, partially in cross section, of an alternative apparatus embodiment for producing displays in accordance with the invention.
Figure 5:
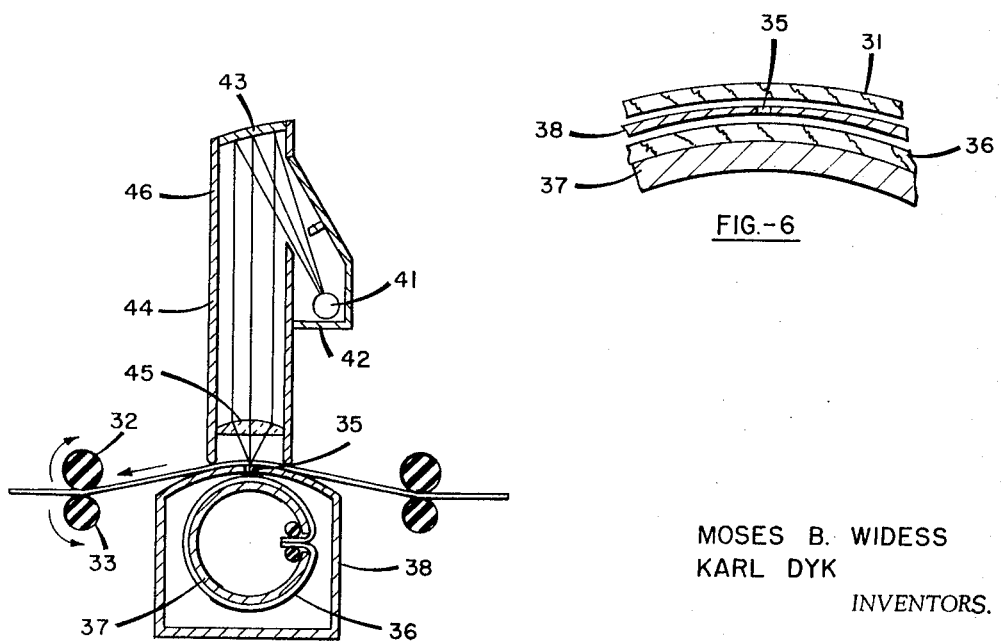
FIGURE 5 is a cross-section view of FIGURE 4 along the lines 5—5.

Variable-density traces are the preferred form of narrow, constant-width display trace, but our invention is not necessarily limited thereto, as narrow variable-area traces, for example, present a pattern of light and dark alignments, when viewed from a distance, quite similar to variable-density traces. In FIGURES 4 and 5 is shown an alternative form of apparatus for producing narrow-trace displays in accordance with our invention. This apparatus is essentially a compression device by which displays made with conventional apparatus and trace width in either variable-density, variable-area, or other constant-width forms can be converted to narrow-trace form in accordance with our invention.

Figure 6:
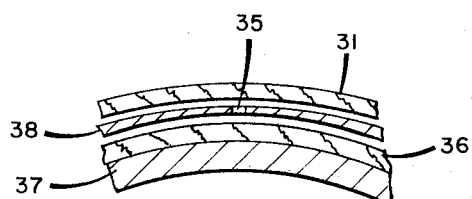
FIGURE 6 is an enlarged cross-section view of the recording aperture slit of the apparatus of FIGURES 4 and 5.

Thus, a thin-paper recording or transparency 31 on which the related traces have been recorded in proper order by conventional variable-density or other recording equipment is moved perpendicularly to the length direction of the traces by driving rollers 32 and 33 actuated by the motor 11. Wide-trace recording 31 is thus drawn past a very narrow slit 35 illuminated from above, to produce an exposure on a photographic medium 36 wrapped around a drum 37 in a light-tight enclosure 38. Drum 37 is driven at a reduced speed by a speed-reducing mechanism 39 connected to the driving roller 32. The reduction in width of the presentation photographically exposed on surface 36 thus is in propotion to the relative speeds of translation of the transparency 31 and of the photographic sheet 36 past the recording slit 35. The latter is preferably quite narrow, as shown in FIGURE 6, typically less than the width of one of the narrowest traces to be recorded on the surface 36; and by making the housing 38 quite thin at the location of slit 35, the two photographic media 31 and 36 can be placed very close together. Although for clarity FIGURE 6 shows media 31 and 36 separated from member 38, they will normally be in contact with it at slit 35. Thus, negligible error is introduced in the compression processes. Due to the finite width of slit 35, however, there is a tendency to convert a wide-trace variable-area display into a narrow-trace variable-density one.

The accuracy of the photographic transfer exposure is aided by the arrangement of light source used. A small-area source 41 in a housing 42 is located at the focal point of a parabolic mirror surface 43, which reflects the light from source 41 as parallel rays 44 in the direction of a cylindrical condensing lens 45, placed above the slit 35 so that the slit coincides with the lens focal point. A housing 46, beneath the edges of which the strip 31 is drawn, excludes extraneous light from entering the slit 35. By proper shielding in the lamp housing 42, the only light from source 31 capable of reaching the slit 35 is that impinging on the mirror surface 43.

In operation, a gear ratio of speed reducer 39 is chosen to give the desired lateral compression ratio for the final display 36 relative to the display 31, which will normally be $n$ times its ordinary width, where $n$ is the number of traces conventionally composited. This width reduction ration is only exemplary, however, as, when $n$ is small, additional compression makes an improved display by further narrowing the individual traces to a point where they merge by becoming visually indistinct. Or, a combination of photographic reduction and lateral compression by this apparatus can be used to alter both the vertical-time and horizontal distance scales of the display to aid visual merging or compositing of the individual narrow traces.

In FIGURE 7 is shown a photographic reproduction of seismic data to which our invention has been applied These data represent six-fold subsurface coverage along a seismic profile line. That is, for each seismic reflection point or area on a subsurface interface, six different traces, made while shooting at six different shot points and receiving at six different seismometer positions, were available. These six traces are displayed, after static and moveout corrections, as a six-narrow-trace group or set. Each two adjacent groups or sets correspond to two neighboring reflection points or areas along the profile line on the subsurface reflecting interface.

As is apparent from inspection of this figure, as compared with FIGURE 8 which is the conventional six-fold, electrically composited representation of the same data, all of the signal alignments that are significant can be seen in both figures with about equal facility. FIGURE 7, in addition, shows typical repetitive angular alignments that are representative of interfering waveforms. Multiple reflections in particular, since they have moveouts that are similar to but different in magnitude from primary reflections, show up prominently as jagged or interrupted alignments. On the basis of the character of the interfering waves, clearly shown in FIGURE 7 but absent in FIGURE 8, the quality of the reflection alignments can be estimated much more reliably for FIGURE 7 than for FIGURE 8.

While a display embodying our invention does not employ compositing in the normal or prior-art sense of that word, it may nevertheless be thought of as a type of visual compositing, in that by our display, the individual traces are purposely rendered so small that at a normal viewing distance a large number of them can be comprehended in one visual glance or fixation, and the individual characteristics of each trace appear to merge or blend with the adjacent traces. Nevertheless, where noise waves interrupt the visual alignment, the presence and character of the noise are readily visible. Also visible is any trace to which an erroneous correction has been applied for static travel-time differences or normal moveout. The correction error here does not disappear into an average effect, as is true of conventional compositing.

In terms of visual effect, when the vertical scale of display is ten inches per second of record time, we have observed that trace widths of $\frac{1}{24}$ to $\frac{1}{100}$ inch provide very good displays. Expressed as a ratio of trace width to display length per second of wave travel time, this corresponds to a ratio value between about 1 to 240 and 1 to 1000; however, ratios outside of this preferred range can still provide very effective and useful displays, the essence of our invention being the individual display of all data traces in a systematic arrangement.

While our invention has so far been described as highly useful in emphasizing primary reflections and discriminating against multiple reflections and other types of non-random noise, it will be apparent that it can also be used to detect or emphasize other types of wave arrivals that it is desired to observe. In general, any type of arrival having a recognizable or determinable time pattern of occurrence can be made to stand out. For example, by applying appropriate corrections certain types of multiple reflections, if present, can be emphasized as alignments, rather than the primary reflections. Further, the effectiveness of devices or procedures for removing, reducing, or canceling particular interfering wave types can be evaluated or improved, by seeing whether their alignments disappear or persist in displays made especially to exhibit them.

In view of the foregoing, still further uses and modifications of the invention will be apparent to those skilled in the art. The scope of the invention, therefore, should not be considered as limited to the details set forth, but it is properly to be ascertained from the appended claims.

We claim:
1. In seismic geophysical surveying, wherein the travel time to each reflection point or area of a subsurface reflecting interface is recorded in a plurality of different ways to provide a corresponding plurality of different but related reproducible traces, the steps comprising
   reproducing each of said related traces corrected for normal moveout of desired signals and for static differences of travel time with respect to a reference datum,
   separately re-recording, for each reflection point or area, each of said reproduced related traces, as one of a corresponding plurality of adjacent, constant-width, visible traces arranged in a systematic manner side-by-side in a group, and
   arranging on a display surface a plurality of said related-trace groups in the order of corresponding successive reflection points of areas along a seismic profile line, to produce a cross-section display in which said desired signals are shown as essentially continuous alignments that extend across a plurality of said related-trace groups, while non-random interfering waves may appear as non-continuous alignments or as characteristic patterns within said groups.

2. The steps in seismic geophysical surveying as in claim 1, wherein said re-recording step comprises, for each reflection point or area, separately recording each of said related traces as one of a group of narrow, variable-density traces arranged side-by-side in a systematic manner in about the same total width of said display surface as a single trace representing said reflection point or area would normally occupy.

3. The steps in seismic geophysical surveying as in claim 2 wherein each narrow variable-density trace has a ratio of width to display length per second of seismic-wave travel time between about 1 to 240 and 1 to 1,000.

4. The steps in seismic geophysical surveying as in claim 1 wherein said related traces are related by having a common subsurface reflection area and a plurality of different arrangements of source and detector, and wherein said re-recording step comprises separately recording each of said related traces as one of a group of narrow, variable-density traces, in which group said traces are arranged in an order of progressive variation of said source-detector arrangements.

5. The steps in seismic geophysical surveying as in claim 4 wherein said different source and detector arrangements are a plurality of different spacings of source and detector having said common subsurface reflection area, and wherein said order of arranging traces is an order of progressive variation of the length of said source-detector spacings.

6. The steps in seismic geophysical surveying as in claim 1 wherein said related traces are related by having common detection and subsurface reflection areas and a plurality of different source depths, and wherein said re-recording step comprises recording said related traces as a plurality of adjacent narrow, variable-density traces in a group wherein they are arranged in an order of varying source depth.

7. The steps in seismic geophysical surveying as in claim 1 wherein said related traces are related by having common source and subsurface reflection areas and a plurality of different detection depths, and wherein said re-recording step comprises recording said related traces as a plurality of adjacent narrow, variable-density traces in a group wherein they are arranged in an order of varying detection depth.

8. The steps in seismic geophysical surveying as in claim 1, including the further step of laterally compressing said cross-section display to bring the ratio of visible-trace width to display length per second of seismic-wave travel time into a range from about 1 to 240 to about 1 to 1,000.

References Cited
UNITED STATES PATENTS

| | | | |
|---|---|---|---|
| Re. 25,160 | 4/1962 | Merten | 340—15.5 |
| 2,710,070 | 6/1955 | Merten | 340—15.5 |
| 2,732,906 | 1/1956 | Mayne | 181—.5 |
| 2,902,107 | 9/1959 | Erath et al. | 340—15.5 |
| 3,105,568 | 10/1963 | Jolly | 181—.5 |
| 3,241,101 | 3/1966 | McNatt | 181—.5 X |

OTHER REFERENCES

Mayne, common reflection point horizontal data stacking technique, Geophysics, vol. 27, No. 6, part II, December 1962, pp. 927–938.

BENJAMIN A. BORCHELT, *Primary Examiner.*

R. M. SKOLNIK, *Assistant Examiner.*

UNITED STATES PATENT OFFICE
CERTIFICATE OF CORRECTION

Patent No. 3,354,427　　　　　　　　　　　　　November 21, 1967

Moses B. Widess et al.

It is hereby certified that error appears in the above numbered patent requiring correction and that the said Letters Patent should read as corrected below.

Column 1, line 63, for "composing" read -- compositing --; column 3, line 47, for "convetnional" read -- conventional --; column 4, line 45, for "position" read -- positions --; column 5, line 62, for "propotion" read -- proportion --; column 6, line 3, before "source" insert -- light --; line 18, for "ration" read -- ratio --; column 7, line 42, for "of" read -- or --.

Signed and sealed this 3rd day of December 1968.

(SEAL)
Attest:

Edward M. Fletcher, Jr.　　　　　　　　　　　EDWARD J. BRENNER
Attesting Officer　　　　　　　　　　　　　　Commissioner of Patents